J. F. W. SHULTZ.
Wagon-Brake.

No. 64,801.  Patented May 14, 1867

United States Patent Office.

JOHN F. W. SCHULTZ, OF MOLINE, ILLINOIS.

Letters Patent No. 64,801, dated May 14, 1867.

IMPROVEMENT IN WAGON-BRAKE.

*The Schedule referred to in these Letters Patent and making part of the same.*

TO ALL WHOM THIS MAY CONCERN:

Be it known that I, JOHN F. WILLIAM SCHULTZ, of Moline, in the county of Rock Island, and State of Illinois, have invented a new and useful Wagon-Brake; and I do hereby declare that the following is a full, clear, and exact description of the construction and operation of the same, reference being had to the annexed drawing making a part of this specification, in which—

Figure 1:
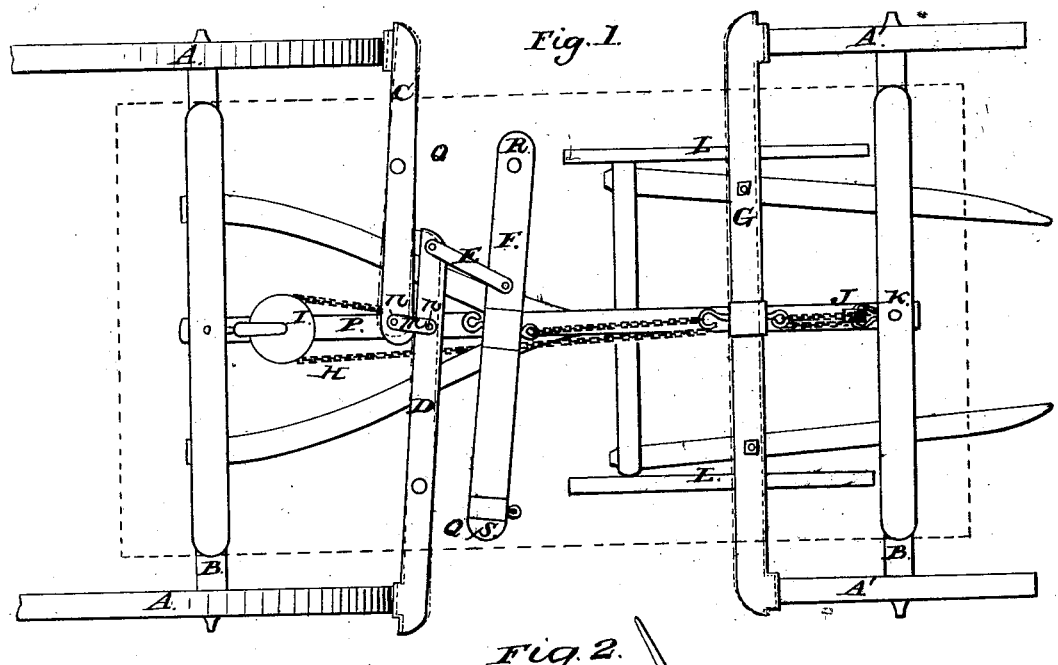

Figure 1 is a plan view of my brake, with the wagon-box removed.

Figure 2:
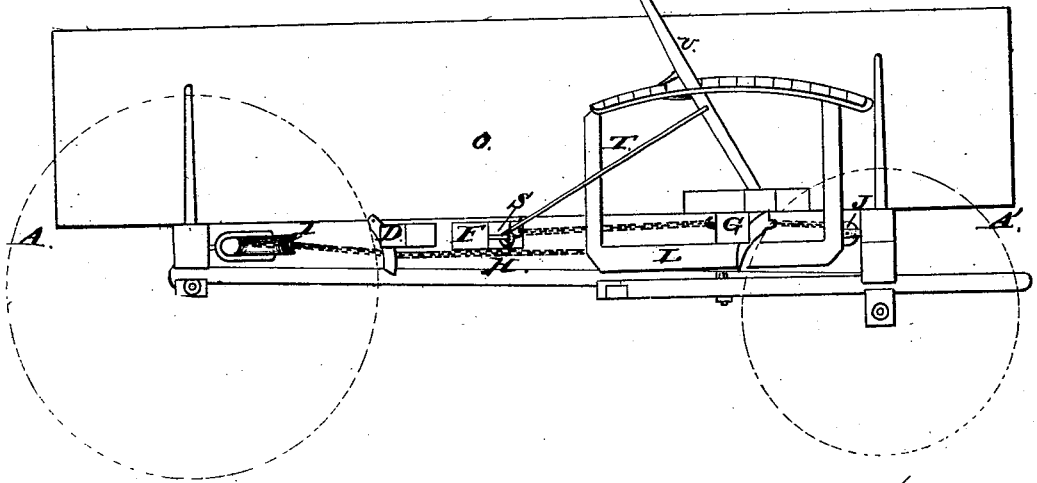

Figure 2, an elevation of the same, with the wagon-wheels removed, in order to give a clear view of the device.

The nature of my invention consists in the use of a series of levers, operated in conjunction with a chain and pulleys attached to the rear and front axle for the purpose of forcing said levers against the fore and hind wheels of the common wagon, in order to check its motion when passing down hill and other dangerous places. I am well aware that brakes have been used for a long time for locking the hind wheels of a wagon, but claim that the pitch of the roads in many parts of the country requires some further means for preventing the wagon from running on to the horses. I claim to have secured this end by arranging a double-acting brake, which is so constructed as to lock all of the wheels and prevent them from turning on the axle when the brake is applied as hereinafter described.

A A' represent the wheels of the wagon, and B the axles, as seen at fig. 1. D C show two levers, the outer ends of which are intended to press against the hind wheels A, as shown at fig. 1. These levers are secured to the under side of box O, shown by red lines at fig. 1, and by an elevation at fig. 2, and are attached together near the reach P, by means of the strap m and bolts n, fig. 1, so as to allow said levers C D to have a swinging motion, as seen by the red line Q, same figure. The lever D is attached to the bar F by means of the strap E, and so arranged as to press against wheel A, when the end S of said bar F is drawn forward by the rod T and lever U; the latter being attached to the box O, fig. 2, in the usual manner. The part G is not a lever but simply a bar operated by the chain H and pulleys I J, and is held in position by means of the guides L, shown more clearly at fig. 2. By this arrangement the lever U, when brought forward, as seen at fig. 2, will force the levers D C against the hind wheels A, and the bar G against the fore wheels A', and lock them, so that they cannot roll, no matter how much load is put upon the wagon, and the descent to be passed over.

The operation is very simple, and similar to that of other brakes. The drawings at fig. 2 represent the brake locked against the wheels A A', and the red-lines W show the same when loosened.

Having thus fully described my device, what I claim, and desire to secure by Letters Patent, is—

The arrangement and combination of the levers D C F, bar G, rod T, lever U, when the whole is operated in connection with the pulleys I J, and chain H, substantially as set forth.

JOHN F. WILLIAM SCHULTZ.

Witnesses:
TURGEN PAHL,
FREEIH DUNKER.